Nov. 5, 1946.  J. A. CHILMAN  2,410,630
BRAKE FOR ELECTRIC MOTORS
Filed May 13, 1943
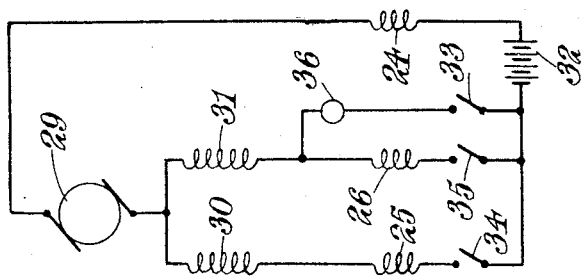
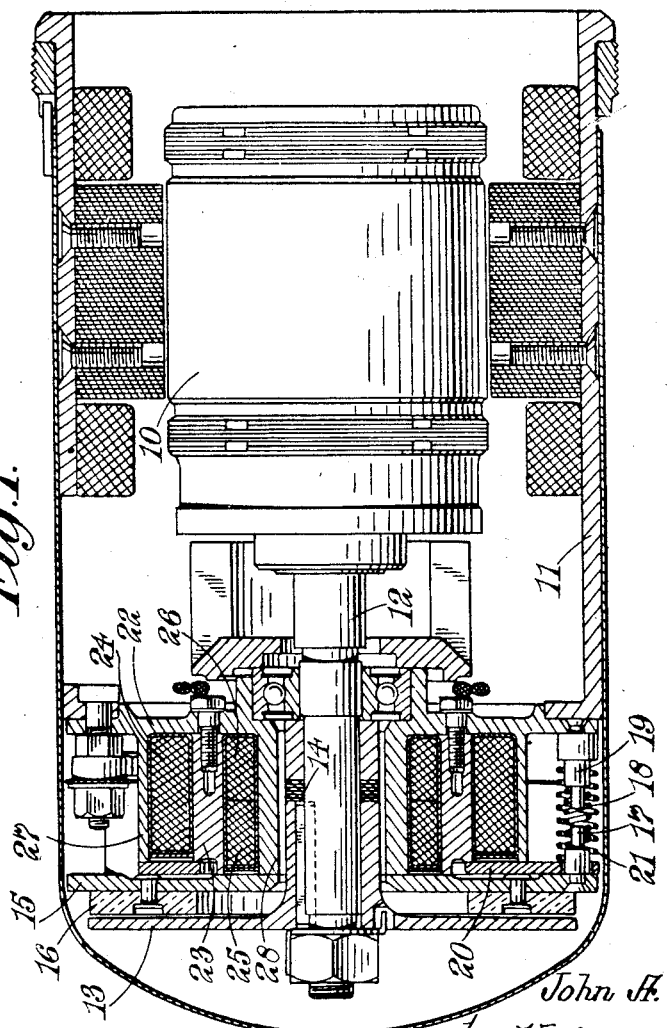
Inventor
John A. Chilman
by Wilkinson & Mawhinney
Attorneys Patented Nov. 5, 1946

2,410,630

UNITED STATES PATENT OFFICE 2,410,630

BRAKE FOR ELECTRIC MOTORS

John Alfred Chilman, Gloucester, England, assignor to Rotol Limited, a British company Application May 13, 1943, Serial No. 486,901
In Great Britain April 24, 1942

4 Claims. (Cl. 188—172)

This invention is concerned with brakes for electric motors and has for its object to provide an improved construction whereby an accurate control of the rotation of the motor can be ensured despite variations in its operating load under different conditions.

According to this invention control means for an electric motor comprises a plurality of brakes each normally operative to retard the motor, and electromagnetic means which can be energised to release one or more of said brakes for different operating conditions of the motor.

According to another feature of this invention, the control means comprises a brake-disc driven by the motor, a co-operating stationary brake-member, an electromagnet having an armature that is spring-pressed normally to apply the brake-member to the disc, but which when energised disengages it, a second electromagnet having an armature spring-pressed towards the first armature to cause it to apply the brake, but which when energised disengages its armature from the first armature, and means for selectively or jointly energising said electromagnets.

The invention also comprises the arrangement wherein there may be provided a plurality of electromagnets operative on one or each of said armatures, when the operating conditions of the motor are such as to call for separate electric circuits.

Other features of this invention will be hereinafter described with reference to one embodiment of it and the novel features pointed out in the claims appended to this specification.

One instance of the use of this invention is in connection with the electric motor for effecting the pitch-changing movements of the blades of a variable-pitch propeller, such as are used on aircraft, but it is to be understood that the invention is not limited thereto since it may be used in connection with variable-pitch marine propellers, or with any electric motor subject to variable loads such, for example, as in the case of cranes, lifts and the like where the loading on the motor is usually biased in one direction.

In the accompanying drawing which illustrates one embodiment of this invention,

Figure 1 is a central sectional view showing the improved construction and arrangement of brakes, and Figure 2 is a circuit diagram showing the application of the improved construction to the pitch-changing motor of an electrically-adjusted variable-pitch propeller.

As stated above, the object of this invention is to provide for the accurate control of the rotation of an electric motor when it is subjected to different loadings, and in the case of the pitch-changing motor of a propeller, the motor is geared to the blades through a suitable reduction gearing to effect their movement. When a propeller is in rotation, the forces acting on the blades are such as to tend to adjust them towards a fine-pitch setting, and when the motor is in operation to effect this adjustment, the reduced load allows the motor speed to rise unduly, so that the inertia of the rotating parts may cause over-adjustment. The differential loading also introduces substantial differences in the time required for making any particular adjustment of the blades according to the direction of such adjustment.

In order to obtain a more accurate control of the motor, it is customary to provide on it a spring-pressed brake which is normally applied to a disc rotating with the motor armature so as to hold it stationary, with an electromagnet which is energised, simultaneously with the energising of the motor, to release the brake when the motor is required to operate. In some cases this brake is required to hold the motor stationary when the load on it is such that it would cause rotation of the motor.

Referring now to Figure 1, the reference 10 indicates an electric motor which is mounted in a suitable housing 11, and is operatively connected with the load. Upon the armature shaft 12 there is secured a brake-disc 13, and the axial position of said disc is adjusted as required by means of shims 14. A braking disc 15 is non-rotatably mounted in the casing 11 and carries a suitable friction element 16 to engage the disc 13. The disc 15 is spring-pressed towards the left into the engaging position of the brake by a number of controlling springs spaced around it. In this particular arrangement the plate 15 has riveted to it small cylindrical abutments 17 each having an end portion of reduced diameter which provides an abutment and guide for the controlling springs 18, the other ends of these springs being located against fixed abutments 19 carried by the motor casing.

The plate-member 15 is capable of a small axial movement for the purpose of engaging and disengaging the braking elements 16 and the brake-disc 13, such movement being effected electromagnetically as hereinafter described.

A second stationary brake-plate 20 is mounted co-axially with the plate 15 behind it and is axially movable relatively thereto; this plate 20 is also provided with controlling springs which normally press it forward into engagement with the plate 15 so as to press the latter forward to cause engagement of the brake, and conveniently the controlling springs for the plate 20 are arranged each co-axially with one of the springs 18 above mentioned. This second set of springs whereof one is indicated at 21, directly engage the plate 20 at one end and the abutment 19 at the other end, and are located by the abutments 17, 19. In the particular application of this invention to a variable-pitch propeller, the springs 18 are made of a light loading relatively to the springs 21.

The two plates 15 and 20 are separately controlled by electromagnets so as to enable them to be released individually or jointly. For this purpose there is provided an open-ended annular magnetic casing 22 which is provided with a coaxial magnetic partition 23 dividing it into two annular compartments of which the outer compartment contains a coil 24, and in the particular example now being described, the inner compartment contains two coils 25, 26. The magnetic circuit for the coil 24 is constituted by the outer wall 27 of the casing, the end 22, the partition 23 and the plate 20, which constitutes a movable armature. Since only a very small air-gap is used for the armature, there is substantially no magnetic leakage which would affect the plate 15 when the coil 24 is energised.

The plate 15 constitutes the armature which is operated by the coils 25, 26, the magnetic circuit of these coils being constituted by the partition 23, the end of the casing 22, the inner wall 28 of the annular casing and the plate 15; in this case also only a small air-gap is provided for the armature so that there is substantially no magnetic leakage which can affect the plate 20.

When none of the coils 24, 25 and 26 is energised, the springs 21 press the plate 20 on to the plate 15 so as to press the braking elements 16 on to the brake-disc 13, and the springs 18 also press the plate 15 in the same direction, so that the total loading on the brake is the total pressure exerted by all the springs. When the coil 24 is energised, its armature 20 is withdrawn against the action of the springs 21, so that only the springs 18 press the brake into engagement, thus giving a much lighter braking load. When either of the coils 25, 26 is energised, the plate 15 is withdrawn against the action of its springs 18, so that the brake-disc 13 is entirely released.

In the particular application of this invention to a variable-pitch propeller, the circuits may be arranged as shown in Figure 2. The pitch-changing motor whereof the armature is indicated at 29 is a series motor having two field-windings 30, 31 to give opposite directions of rotation and the coil 24 which controls the major part of the braking force is connected in series with the motor in the return lead to the battery 32, so that it is energised whenever the motor is energised to run in either direction.

The field-winding 30 is energised to rotate the motor in such a direction as to adjust the blades to a coarser pitch, in which case the loading on the motor is heavier than when it is adjusting the blades to a finer pitch, when the field-winding 31 is energised. It is therefore required to release the brakes entirely when adjusting towards a coarse-pitch position, and the coil 25 is therefore connected in series with the field-winding 30 so that the armature 15 is retracted to disengage the brake-disc; it will be appreciated that whenever the motor is energised, as stated above, the coil 24 is energised to release the armature 20.

When the blades are being adjusted towards a finer pitch setting, the loading on the motor is comparatively light and in order that it shall not attain an excessive speed, the lightly loaded brake constituted by the plate 15 is not released, and for this purpose the motor circuit is completed through the field-winding 31 and the switch 33. In this way the coil 26 is not energised, so that the lightly loaded brake is applied.

All normal operations of the pitch-changing motor, for comparatively small adjustments such as are required in maintaining the speed of the propeller constant at any predetermined value are effected in the manner just described by the switches 33 and 34, but there are certain adjustments which are required in emergencies or on rare occasions in which it is desirable to effect the pitch-changing movement as rapidly as possible such as adjusting the blades to a reverse-setting or to a feathered setting. To attain a reverse-setting, the blades are adjusted towards a finer-pitch setting but the movement is continued beyond the normal fine-pitch setting which is usually controlled by a mechanically operated limit switch 36 in series with the switch 33, and there is therefore provided a reversing switch 35 in a circuit separate from the circuit of the limit switch 36. In attaining the reverse-pitch setting, the blades pass through a position of zero setting in which there would be substantially no aerodynamic loading on the propeller-blades, so that the engine would race, and it is desirable, therefore, to effect the reversing operation very rapidly. For this purpose the coil 26 is connected in series with the switch 35 and field-winding 31 so that when the switch 35 is closed both brakes are released and the motor 29 is allowed to attain its maximum speed to effect a rapid reversal of pitch.

When it is required to adjust the blades back from the reverse-setting to a normal pitch-setting, this is effected by reversing the motor so that it adjusts the blades towards a coarser-pitch setting, the field-winding 30 being energised through the switch 34 for this purpose. Again it is desirable to effect this operation rapidly, and moreover, the adjustment in this direction causes a heavier loading so that both brakes are released by the energising of the coils 24 and 25 as above described.

Another emergency operation which is sometimes required, is feathering of the blades, and this is effected by adjusting them in the direction towards a coarser-pitch, but continuing the adjustment beyond the ordinary range until the blades are feathered. Since the adjustment is in this particular direction, the loading on the motor is heavy, as mentioned above, and moreover, it is desirable that the operation should be effected rapidly so that feathering is effected by means of the switch 34 which energises the coil 25 so that in this case also both brakes are released and the motor operates at its maximum possible speed.

When returning from the feathered position, the conditions are somewhat different. The direction of operation of the blades is towards a finer pitch setting, and it is required therefore to energise the field-winding 31. It is desirable, however, that the operation of unfeathering should take place comparatively slowly, since the engine may be cold and it is undesirable that it should be started up too rapidly by the windmill action of the blades as they are moved from their feathered position. Unfeathering is therefore effected by means of the switch 33 so that the coil 26 is not energised and the lightly loaded brake is still applied to the brake-disc on the motor. After the engine has started, the centrifugal force on the blades which is brought into operation reduces the loading on the motor and it is therefore still desirable to maintain the light loading by the brake.

The switches 33, 34 and 35 in Figure 2 are purely diagrammatic, and any of the known arrangements of manual and governor control switches may be used in the manner above described. If the limit switch 36 is such that it is opened during the unfeathering operation, a separate unfeathering switch may be provided short-circuiting the switch 36 in order that the unfeathering shall not be stopped by the normal fine-pitch limiting switch.

It will be seen that with the construction above described, various degrees of braking effect can be obtained with a single pair of co-operating brake-members, and moreover these variations are obtained by the energising of the appropriate electromagnets which are required simply to move their armatures between "on" and "off" positions so that it is not necessary to effect exact control of the current supplied to the magnets.

I claim:

1. Control means for an electric motor comprising a rotary brake-disc driven by the motor, a co-operating non-rotary brake-member, an electromagnet having an armature that is spring-pressed normally to apply the brake-member to the disc, but which when energised disengages it, a second electromagnet having an armature spring-pressed towards the first armature to cause it to apply the brake, but which when energised disengages its armature from the first armature, and means for selectively or jointly energising said electromagnets.

2. A construction according to claim 1, comprising a plurality of electromagnets alternatively operative on one of said armatures.

3. A construction according to claim 1 comprising an annular magnetic casing co-axial with the brake-disc, a co-axial annular magnetic partition therein providing two co-axial open-ended annular compartments with an electromagnet in each compartment, said armatures completing respectively the magnetic circuits of the electromagnets in the two compartments.

4. Control means for an electric motor as claimed in claim 1 in which a plurality of electromagnets are alternatively operative on said first-mentioned armature.

JOHN ALFRED CHILMAN.